US008910184B2

(12) United States Patent
Dixon et al.

(10) Patent No.: US 8,910,184 B2
(45) Date of Patent: Dec. 9, 2014

(54) APPLICATION ACCESS TO LDAP SERVICES THROUGH A GENERIC LDAP INTERFACE INTEGRATING A MESSAGE QUEUE

(75) Inventors: Bret W. Dixon, South Perth (AU); Scot Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 13/283,975

(22) Filed: Oct. 28, 2011

(65) Prior Publication Data

US 2013/0111499 A1 May 2, 2013

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC ........ G06F 9/44 (2013.01); G06F 9/546 (2013.01); G06F 2209/547 (2013.01); G06F 13/00 (2013.01)
USPC .......................................... 719/314

(58) Field of Classification Search
None
See application file for complete search history.

(56) References Cited

U.S. PATENT DOCUMENTS

| 5,916,307 | A   | * | 6/1999  | Piskiel et al. .............. 719/314 |
| 6,016,499 | A   |   | 1/2000  | Ferguson |
| 6,226,689 | B1  | * | 5/2001  | Shah et al. .................... 719/314 |
| 7,370,335 | B1  |   | 5/2008  | White et al. |
| 7,853,612 | B2  |   | 12/2010 | Nelson et al. |
| 7,873,678 | B2  |   | 1/2011  | Tonev et al. |
| 8,130,924 | B2  | * | 3/2012  | Rossi et al. .............. 379/112.06 |
| 8,190,675 | B2  | * | 5/2012  | Tribbett ...................... 709/203 |
| 2002/0152210 | A1 | * | 10/2002 | Johnson et al. .................... 707/9 |
| 2006/0095332 | A1 | * | 5/2006  | Riemann et al. ................. 705/22 |
| 2008/0288465 | A1 |   | 11/2008 | Payton et al. |
| 2009/0138891 | A1 |   | 5/2009  | Winig et al. |
| 2010/0228748 | A1 |   | 9/2010  | Dixon |
| 2010/0228766 | A1 |   | 9/2010  | Dixon |
| 2010/0306277 | A1 |   | 12/2010 | Rimer et al. |
| 2013/0111500 | A1 |   | 5/2013  | Dixon et al. |

OTHER PUBLICATIONS

Office Action, U.S. Appl. No. 13/284,067, filed Oct. 28, 2011, In re Dixon, mailing date Feb. 15, 2013, 49 pages.
Final Office Action, mailed Aug. 14, 2013, U.S. Appl. No. 13/284,067, filed Oct. 28, 2011, Bret W. Dixon et al, 32 pages.
U.S. Appl. No. 13/284,067, filed Oct. 28, 2011, Bret W. Dixon et al, 40 pages.
Notice of Allowance, mailing date Aug. 4, 2014, U.S. Appl. No. 13/284,067, filed Oct. 28, 2011, In re Dixon, 46 pages.

* cited by examiner

*Primary Examiner* — Andy Ho
*Assistant Examiner* — William C Wood
(74) *Attorney, Agent, or Firm* — Diana R. Gerhardt; Amy J. Pattillo

(57) ABSTRACT

An LDAP bridge service retrieves a generic LDAP message request, placed in a request queue by a message queuing application, from the request queue. The LDAP bridge service formats the generic LDAP request into a particular API call for at least one LDAP API. The LDAP bridge service calls at least one LDAP API with the particular API call for requesting at least one LDAP service from at least one LDAP server managing a distributed directory. Responsive to the LDAP bridge service receiving at least one LDAP specific response from at least one LDAP API, the LDAP bridge service translates the LDAP specific response into a response message comprising a generic LDAP response. The API bridge service, places the response message in a response queue of the message queuing network, wherein the message queuing application listens to the response queue for the response message.

19 Claims, 6 Drawing Sheets

APPLICATION ACCESS TO LDAP SERVICES THROUGH A GENERIC LDAP INTERFACE INTEGRATING A MESSAGE QUEUE

1. TECHNICAL FIELD

The embodiment of the invention relates generally to data processing systems and particularly to message queuing application access to LDAP services through a generic LDAP interface integrating a message queue, wherein the message queuing application receives LDAP services without the message queuing application calling the LDAP API.

2. DESCRIPTION OF THE RELATED ART

The Lightweight Directory Access Protocol (LDAP) is an application protocol that supports reading and writing of directory data over a network. An LDAP server controls access to a database that provides a convenient and centralized repository for directory data to applications that access the LDAP server for data accesses.

In one example, applications call an LDAP application programming interface (API) to establish a communication session with an LDAP server and then call the LDAP API to read, modify, or delete directory data. The connection-oriented communication session between an application and an LDAP server through an LDAP API call requires the application to maintain a connection to the LDAP API while the LDAP server is performing functions on the directory data. In addition, for an application to access an LDAP server through an LDAP API, the application is programmed to call the LDAP API, binding the functionality of the application to the API. An application bound to an LDAP API requires programming maintenance and updates whenever the LDAP API is updated. In addition, the performance of an application bound to an LDAP API is affected by changes to the location and availability of servers hosting the API.

BRIEF SUMMARY

In view of the foregoing, there is a need for a method, system, and program product for an application to access LDAP services through a generic LDAP interface integrating a message queue interface, such that applications are able to access LDAP services without calling an LDAP API.

In one embodiment of the invention, a method, system, and computer program product for managing message queuing application access to LDAP services, without the message queuing application calling an LDAP API, include an LDAP bridge service listening to a request queue of a message queuing network.

In one embodiment, a method for a message queuing application to access a logical directory access protocol (LDAP) service is directed, responsive to an LDAP bridge service detecting a request message placed in a request queue of a message queuing network by a message queuing application, retrieving, by the LDAP bridge service, the request message from the request queue, wherein the request message comprises a generic LDAP message request, wherein the generic LDAP message request comprises an LDAP server request in a message queue format. The method is directed to formatting, by the LDAP bridge service, the generic LDAP message request in the request message into a particular API call for at least one LDAP API. The method is directed to calling, by the LDAP bridge service, at least one LDAP API with the particular API call for requesting at least one LDAP service from at least one LDAP server managing a distribution directory, wherein the LDAP server is accessed through the at least one LDAP API. The method is directed, responsive to the LDAP bridge service receiving at least one LDAP specific response from at least one LDAP API, to formatting, by the LDAP bridge service, the at least one LDAP specific response into a response message comprising a generic LDAP response. The method is directed to placing, by the LDAP bridge service, places the response message in a response queue of the message queuing network, wherein the message queuing application listens for the response queue for the response message and retrieves the response message to receive at least one LDAP service from the at least one LDAP API without calling the at least one LDAP API.

In another embodiment, a system for a message queuing application to access a logical directory access protocol (LDAP) service comprises an LDAP bridge service, comprising at least one processor and a memory, responsive to an LDAP bridge service detecting a request message placed in a request queue of a message queuing network by a message queuing application, operative to retrieve, the request message from the request queue, wherein the request message comprises a generic LDAP message request, wherein the generic LDAP message request comprises an LDAP server request in a message queue format. The system comprises the LDAP bridge service operative to format the generic LDAP message request in the request message into a particular application programming interface (API) call for at least one LDAP API. The system comprises the LDAP bridge service operative to call the at least one LDAP API with the particular API call for requesting at least one LDAP service from at least one LDAP server managing a distributed directory, wherein the LDAP server is accessed through the at least one LDAP API. The system comprises the LDAP bridge service, responsive to the LDAP bridge service receiving at least one LDAP specific response from at least one LDAP API, operative to translate the at least one LDAP specific response into a response message comprising a generic LDAP response. The system comprises the LDAP bridge service operative to place the response message in a response queue of the message queuing network, wherein the message queuing application listens to the response queue for the response message and retrieves the response message to receive the at least one LDAP service through the at least one LDAP API without calling the at least one LDAP API.

In another embodiment, a computer program product for a message queuing application to access a logical directory access protocol (LDAP) service comprises one or more computer-readable, tangible storage devices. The computer program product comprises program instructions, stored on at least one of the one or more storage devices, responsive to an LDAP bridge service detecting a request message placed in a request queue of a message queuing network by a message queuing application, to retrieve, by the LDAP bridge service, the request message from the request queue, wherein the request message comprises a generic LDAP message request, wherein the generic LDAP message request comprises an LDAP server request in a message queue format. The computer program product comprises program instructions, stored on at least one of the one or more storage devices to format, by the LDAP bridge service, the generic LDAP message request in the request message into a particular application programming (API) call for at least one LDAP API. The computer program product comprises program instructions, stored on at least one of the one or more storage device to call, by the LDAP bridge service, the at least one LDAP API with the particular API call for requesting at least one LDAP service managing a distributed directory, wherein the LDAP server is accessed through the at least one LDAP API. The computer program product comprises program instructions, stored on at least one of the one or more storage devices, responsive to the LDAP bridge service receiving at least one LDAP specific response from the at least one LDAP API, to translate, by the LDAP bridge service, the at least one LDAP specific response into a response message comprising a generic LDAP response. The computer program product comprises program instructions, stored on at least one of the one or more storage devices, to place, by the LDAP bridge service, the response message in a response queue of the message queuing network, wherein the message queuing application listens to the response queue for the response message and retrieves the response message to receive the at least one LDAP API service through the at least one LDAP API without calling the at least one LDAP API.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
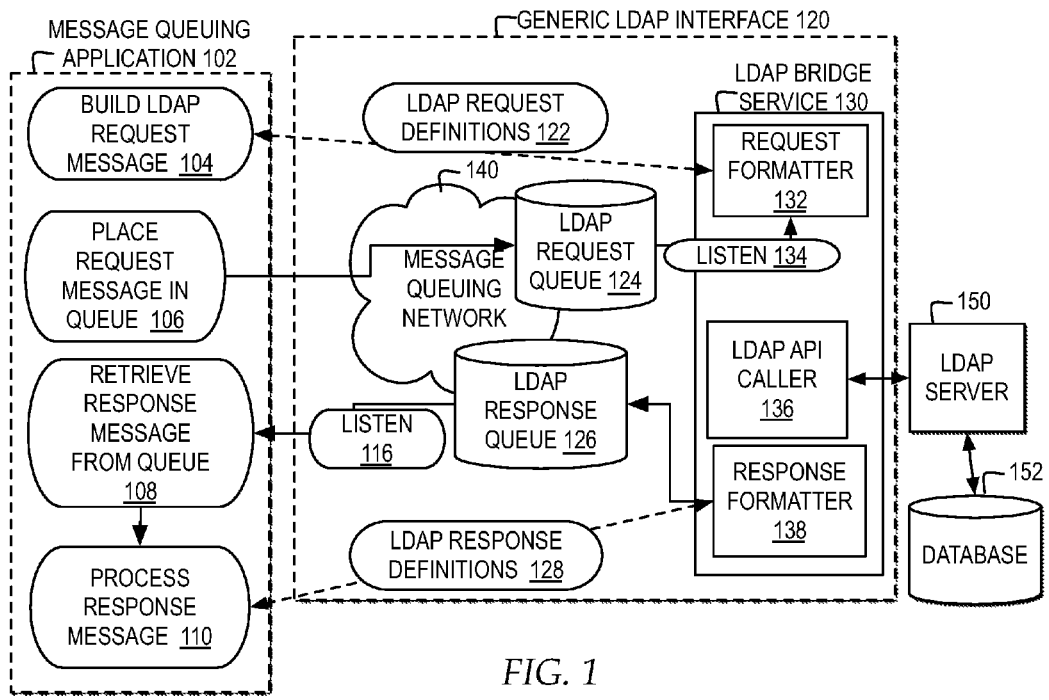
FIG. 1 illustrates a block diagram of a generic LDAP interface with message queuing for managing access by a message queuing application to LDAP services through generic LDAP requests placed by the message queuing application in a message queue of the generic LDAP interface.

FIG. 1 illustrates a block diagram of a generic LDAP interface with message queuing for managing access by a message queuing application to LDAP services through generic LDAP requests placed by the message queuing application in a message queue of the generic LDAP interface.

As illustrated, a message queuing application 102 communicates with a generic LDAP interface 120. In particular, generic LDAP interface 120 provides an interface through which message queuing application 120 has access to one or more message queues integrated within generic LDAP interface 120. In the example, generic LDAP interface 120 includes a message queuing network 140. A queue manager and message queue APIs of message queuing network 140, in general, are called by message queuing application 102 to handle storage and retrieval of data in the form of messages on message queues of message queuing network 140 using a message queue API. The queue manager manages the storage and retrieval of the messages data from the message queues. While message queuing network 140 is illustrated as representing a message queue system with one or more message queues positioned on one or more systems communicatively connected through a network and the associated management services and queue APIs, in other embodiments, generic LDAP interface 120 may implement additional or alternate types of message queuing networks or message queuing systems.

In the example, generic LDAP interface 120 allows for message queuing application 102 to access LDAP services from an LDAP server 150 implemented using LDAP API calls without message queuing application 102 calling the LDAP API and establishing a connection-oriented communication session with LDAP server 150. In the example, LDAP server 150 hosts LDAP services provided by calling an LDAP API. Generic LDAP interface 120 provides an interface through which message queuing application 102 may access LDAP services without message queuing application 102 needing to call or bind to an LDAP API to access the LDAP services.

In the example, LDAP server 150 hosts an LDAP service for accessing and maintaining distributed directory services. In one example, LDAP server 150 maintains one or more directories in one or more databases, such as database 152. Examples of LDAP services provided by LDAP server 150 by calling an LDAP API in a protocol specified for the LDAP API include, but are not limited to, "start TLS" to start a secure connection to LDAP server 150, "bind" to authenticate and specify an LDAP protocol version for LDAP server 150, "search" to search for or retrieve directory entries maintained by LDAP server 150, "compare" to test if a named entry contains a particular attribute value, "add a new entry" to add an entry to the distributed directory maintained by LDAP server 150, "delete an entry" to delete an entry from the distributed directory maintained by LDAP server 150, "modify an entry" to modify an entry in the distributed directory maintained by LDAP server 150, "modify Distinguished Name" to move or rename an entry in the distributed directory maintained by LDAP server 150, "abandon" to abort a previous request to LDAP server 150, and "unbind" to close the secure connection to LDAP server 150. While in the example LDAP server 150 is illustrated as hosting LDAP services provided by calling the LDAP API, in additional or alternate embodiments, additional or alternate servers may provide LDAP services called through LDAP APIs and in additional or alternate embodiments, LDAP services provided by calling LDAP APIs may be hosted by other types of systems, from services such as a cloud service, or from distributed environment systems.

In the example, to facilitate message queuing application 102 access to LDAP services provided by LDAP server 150 through the LDAP API without message queuing application 102 calling the LDAP API or establishing a connection to LDAP server 150, generic LDAP interface 120 includes at least one queue for request messages, illustrated as LDAP request queue 124, and at least one queue for reply messages, illustrated as LDAP response queue 126, within a message queuing network 140. Message queuing application 102 may represent an application, service, or other component that at least builds messages for placement in LDAP request queue 124 and processes messages read from LDAP response queue 126. In addition, message queuing application 102 may perform additional functions for interfacing with message queuing network 140 and message queuing application 102 may be called by other applications. In one embodiment, the IBM® Information Management System (IMS™), the IBM® Customer Information Control System (CICS®), and the IBM® Websphere® Application Server (WAS) products are examples of systems that support message queuing, including support for message queuing network 140, or provide components that use message queuing, such as message queuing application 102. In one example, message queuing is used extensively by customer-developed applications that conform to their own application naming conventions.

Each of LDAP request queue 124 and LDAP response queue 126 may represent named destinations to which messages can be sent and from which messages can be retrieved within one or more systems accessible within message queuing network 140. Message queuing network 140 may include one or more systems communicatively connected via one or more networks and providing message queuing services through a queue manager, including message queue APIs and other queue management services. Generic LDAP interface 120 may include additional or alternate queues within message queuing network 140 and may include additional or alternate message queuing networks.

As illustrated at reference numeral 104, when message queuing application 102 requires access to LDAP services, message queuing application 102 builds a request message to place in LDAP request queue 124, such that message queuing application 102 makes a request for LDAP service without calling an LDAP API. In the example, message queuing application 102 may build request messages conforming to LDAP request definitions 122 specified for generic LDAP interface 120. In particular, in building request messages conforming to LDAP request definitions 122, message queuing application 102 builds structured data messages for LDAP request message, where an LDAP request message represents an LDAP service request in a message queue format. In the example, the message format specified in LDAP request definitions 122 is distinguishable from a protocol specified for calls to the LDAP API. In one example, LDAP request definitions 122 and LDAP response definitions 128 may specify structured data messages in a structured data language such as Extensible Markup Language (XML) or may specify structured data messages in a simple delimited string format. In another example, LDAP request definitions 122 and LDAP response definitions 128 may specify structured data messages in an IBM® WebSphere® MQ Programmable Control Format (PCF) or equivalent message structure.

In addition, message queuing application 102, as illustrated at reference numeral 106 requests placement of the request message in LDAP request queue 124 of generic LDAP interface 120 to be read by a LDAP bridge service 130 of generic LDAP interface 120. In the example, message queuing application 102 may call a message queue API of message queuing network 140 to handle locating LDAP request queue 124 within message queuing network 140 and to handle placing the request message in LDAP request queue 124. In addition, message queuing application 102 may call the message queue API of message queuing network 140 to listen for API response messages placed in LDAP response queue 126, illustrated at reference numeral 116.

In the example, LDAP bridge service 130 is another layer of generic LDAP interface 120. LDAP bridge service 130 listens for structured data request messages on LDAP request queue 124 and reads new structured data request messages placed in LDAP request queue 124. In one example, LDAP bridge service 130 may call the message queue API of message queuing network 140 to listen for LDAP request messages placed in LDAP request queue 124 and read the messages from LDAP request queue 124, illustrated at reference numeral 134. In one example, LDAP bridge service 130 is a service that can be started and stopped as required. While the example is illustrated with LDAP bridge service 130 listening to LDAP request queue 124, illustrated at reference numeral 134, LDAP bridge service 130 may also monitor additional LDAP request queues within message queuing network 140 or additional LDAP request queues within other message queuing networks.

As illustrated, a request formatter 132 of LDAP bridge service 130 validates the new structured data request message read by listener 134 based on the specifications in LDAP request definitions 122 and translates the new structured data request message into at least one specific LDAP API call. An LDAP API caller 136 of LDAP bridge service 130 manages calling the LDAP API for at least one LDAP server 150, with the LDAP API call for the service requested in the LDAP request message. In particular, in the example, while message queuing application 102 generates API-independent, LDAP requests for specific LDAP services, request formatter 132 generates LDAP API calls for specific LDAP services and LDAP API caller 136 calls and binds to the LDAP API.

As illustrated, LDAP server 150 receives specific LDAP API calls by LDAP API caller 136 of LDAP bridge service 130 to call one or more specific LDAP services. LDAP server 150 receives specific LDAP API calls, processes the specific LDAP API calls, and returns LDAP API specific responses to LDAP bridge service 130. While LDAP server 150 is illustrated in the example, in other embodiments, LDAP API caller 136 may call LDAP services on additional or alternate servers.

A response formatter 138 of LDAP bridge service 130 receives LDAP API specific responses from LDAP server 150, validates the LDAP API specific responses and translates the LDAP API specific responses into response messages with generic LDAP responses, based on specifications in LDAP response definitions 128. In one example, response formatter 138 translates LDAP API specific responses into structured data message responses based on LDAP response definitions 128.

In the example, when the LDAP API called by LDAP API caller 136 is updated or the location of the LDAP API called for API server is updated, specific LDAP caller 136 receives the updates and modifies request formatter 132 to reflect the updates. By updating LDAP bridge service 130 when LDAP APIs called by LDAP bridge service 130 are updated, message queuing application 102 may access updated LDAP services for updated LDAP APIs, but since there are not references to the specific LDAP APIs in message queuing application 102, message queuing application 102 does not need to be updated for each update of an LDAP API.

Response formatter 138 places structured data message responses in LDAP response queue 126 of generic LDAP interface 120. In addition, if request formatter 132 or response formatter 138 are not able to validate the request message or response message or other errors are detected by LDAP bridge service 130, LDAP bridge service 130 places error messages in LDAP response queue 126 to return to the requesting message queuing application. In addition, message queue network 140 detects error messages and may provide error message handling services.

In the example, message queuing application 102 listens to LDAP response queue 126 and retrieves response messages from LDAP response queue 126, as illustrated at reference numeral 108. In the example, message queuing application 102 may listen to LDAP response queue 126 until a response to the request is received through a message queue API of message queuing network 140 by message queuing application 102, as illustrated at reference numeral 116. As illustrated at reference numeral 110, message queuing application 102 processes response messages retrieved from LDAP response queue 126 in accordance with LDAP response definitions 128.

In one example, message queuing application 102 may build a structured data generic LDAP request message, as illustrated at reference numeral 104, according to LDAP request definitions 122, in an XML format such as:

```
char *ldap_get_dn(
    LDAP    *ld,
    LDAPMessage *entry)
<LDAPRequest>
    <LDAPHeader>
        <LDAPFunction>ldap_get_dn</LDAPFunction>
        <LDAPParmCount>2</LDAPParmCount>
    </LDAPHeader>
    <LDAPBody>
        <LDAPParameter>
            <LDAPParmName>ld</LDAPParmName>
            <LDAPParmType>handle</LDAPParmType>
            <LDAPParmValue>0x0428FCD0</LDAPParmValue>
        </LDAPParameter>
        <LDAPParameter>
            <LDAPParmName>entry</LDAPParmName>
            <LDAPParmType>handle</LDAPParmType>
            <LDAPParmValue>0x02BD0520</LDAPParmValue>
        </LDAPParameter>
    </LDAPBody>
</LDAPZRequest>
```

In the example, message queuing application 102 may call a message queue API of message queuing network 140 to connect to a message queue manager, such as by calling MQCONN, and call a message queue API of message queuing network 140 to place the generic LDAP request in LDAP request queue 124, such as by calling MQPUT(LDAPRequest), where message queuing network 140 includes a messaging service provided by Websphere MQSeries®. Request formatter 132 may call a message queue API of message queuing network 140 to listen to LDAP request queue 124, call a message queue API such as MQGET(LDAPRequest) to retrieve the request message, and formats the LDAPRequest message into an API call for an LDAP API. LDAP API caller 136 calls LDAP server 150 for the particular LDAP API call. Response formatter 138 formats a response from LDAP server 150 into a structured data generic LDAP response message, according to LDAP response definitions 128, in an XML format such as:

```
char *ldap_get_dn(
    LDAP    *ld,
    LDAPMessage *entry
<LDAPReply>
    <LDAPHeader>
        <LDAPFunction>ldap_get_dn</LDAPFunction>
        <LDAPParmCount>1</LDAPParmCount>
    </LDAPHeader>
    <LDAPBody>
        <LDAPParameter>
            <LDAPParmName>dn</LDAPParmName>
            <LDAPParmType>string</LDAPParmType>
            <LDAPParmValue>CN=John Doe,O=IBM, C=US</LDAPParmValue>
        </LDAPParameter>
    </LDAPBody>
    <LDAPResult>
        <LDAPCompletion>
            <LDAPParmType>integer</LDAPParmType>
            <LDAPParmValue>0</LDAPParmValue>
        </LDAPCompletion>
        <LDAPReason>
            <LDAPParmType>integer</LDAPParmType>
            <LDAPParmValue>0</LDAPParmValue>
        </LDAPReason>
    </LDAPResult>
</LDAPeply>
```

Response formatter 138 may call a message queue API of message queuing network 140 to place the generic LDAP response in LDAP response queue 126, such as by calling MQPUT(LDAPReply). Message queuing application 102 listens to LDAP response queue 126 and calls the message queue API of message queuing network 140 to retrieve the generic LDAP response message from LDAP response queue 126, such as by calling MQGET(LDAPReply).

The response message retrieved by message queuing application 102 from LDAP response queue 126 of generic LDAP interface 120 and processed by message queuing application 102 provides message queuing application 102 with a specific LDAP service through generic LDAP interface 120, without message queuing application 102 referencing the LDAP API, without message queuing application 102 establishing direct connections with LDAP server 150, and without message queuing application 102 calling the specific API providing the specific API service. By message queuing application 102 accessing LDAP services through generic LDAP interface 120, message queuing application 102 is isolated from changes to the LDAP API and changes to the location and availability of LDAP servers. In particular, in the example, by message queuing application 102 requesting placement of request messages in LDAP request queue 124, which is listened to by LDAP bridge service 130, and message queuing application 102 retrieving response messages from LDAP response queue 126, placed by LDAP bridge service 130, message queuing application 102 communicates with LDAP bridge service 130 without there being any connection-oriented communication session or physical connection between message queuing application 102 and LDAP bridge service 130 or with LDAP server 150, which provides LDAP services. LDAP server 150 may provide LDAP services to message queuing application 102, without any connection between message queuing application 102 and API server 150, based on LDAP API calls by LDAP bridge service 130. In the example, there may be connection-oriented communication sessions or physical connections between LDAP bridge service 130 and LDAP server 150 or LDAP bridge service 130 and LDAP server 150 may indirectly communicate through another layer of message queues implemented between LDAP bridge service 130 and LDAP server 150.

In the example, generic LDAP interface 120 provides a time-independent, asynchronous interface to message queuing applications, including the characteristics of message queue systems, through which message queuing application 102 can invoke specific LDAP services through messages, such that to access specific LDAP services, message queuing application 102 is not required to maintain complex coding for specific LDAP APIs or dependency on LDAP API bindings within the code of message queuing application 102. For example, one characteristic of message queue systems is a time-independent communication interface. In the example, message queuing application 102 can request an LDAP service by placing a request message in LDAP request queue 124 of generic LDAP interface 120 and then continue to perform other work until LDAP bridge service 130 returns a response message from LDAP server 150 through the LDAP API called by LDAP bridge service 130. In another example, other characteristics of message queue systems include, but are not limited to, guaranteed delivery of a request message and delivery of a response message, error handling, message security, data integrity services, and data recovery support services. In the example, message queuing network 140 of generic LDAP interface 120 may include message queue services to guarantee delivery of the request message and delivery of a response message, handle errors, secure communications, maintain data integrity, and manage data recovery.

In contrast to the example illustrated in FIG. 1, if message queuing application 102 or an application that otherwise passes LDAP requests to message queuing application 102, does not request LDAP services through generic LDAP requests submitted to generic LDAP interface 120, one alternative for message queuing application 102 or other applications invoking LDAP services would require calls by message queuing application 102 or other applications to LDAP APIs, requiring more complex, LDAP API service calls and dependency on LDAP API bindings coded into the calling application and calling an LDAP API would include, but is not limited to, identifying the current location of the LDAP API service, waiting for availability to connect with the LDAP API service at the current location, establishing a secure connection with the LDAP API service at the current location, maintaining the connection with the LDAP API service until a response is returned, handling any errors returned by the LDAP API service, and handling data recovery for lost communications.

In the example in FIG. 1, message queuing application 102 and one or more components of generic LDAP interface 120 may be implemented within a same system or distributed across multiple systems. In addition, in the example in FIG. 1, communication connections illustrated between message queuing application 102, components of generic LDAP interface 120, and LDAP server 150 may represent communicative connections within a system or across a network.

Figure 2:
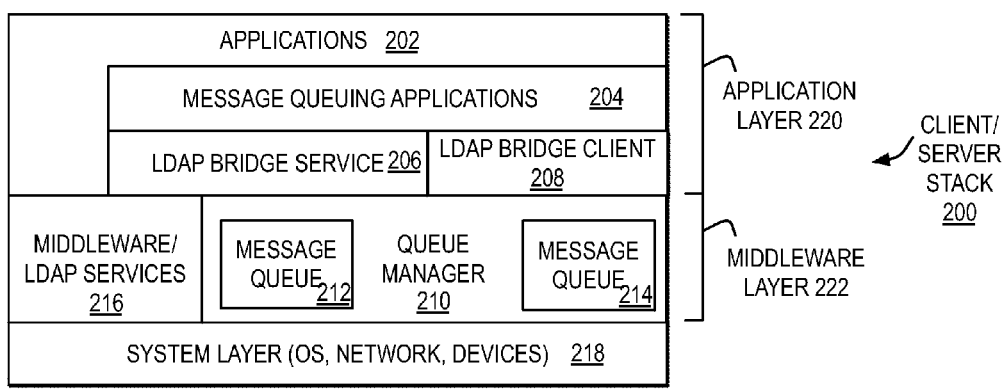
FIG. 2 illustrates a block diagram of one example of a system layer diagram for a client and server implementation of a message queuing application and generic LDAP interface running on a same system.

FIG. 2 illustrates a block diagram of one example of a system layer diagram for a client and server implementation of a message queuing application and generic LDAP interface running on a same system. In the example, a client/server stack 200 includes multiple layers, including an application layer 220, a middleware layer 222, and a system layer 218, which may include one or more of one or more operating system (OS) layers, one or more network layers, and one or more devices and device layers.

In the example, application layer 220 may include applications 202, message queuing applications 204, an LDAP bridge service 206, and an LDAP bridge client 208. In addition, in the example, middleware layer 222 may include middleware and LDAP services 216, queue manager 210, and message queues 212 and 214. In one example, LDAP bridge client 208 of message queuing applications 204 includes message queuing application 102, LDAP bridge service 206 includes LDAP bridge service 130, queue manager 210 includes a queue manager implemented within message queuing network 140, message queue 212 includes LDAP request queue 124, message queue 214 includes LDAP response queue 126, and middleware and LDAP services 216 includes one or more of the LDAP services called from LDAP server 150. In the example, LDAP bridge client 208 includes at least one message queuing application of message queuing applications 204 that access and use generic LDAP interface 120.

Queue manager 210 may include management services for managing reliable message queuing in message queues 212 and 214, allowing messages to be queued and accessed asynchronously by applications when active, allowing multiple providers to place messages in and access messages from message queues 212 and 214, ensuring that queued messages are delivery exactly once, ensuring data security of message placements and accesses, and handling errors. In addition, queue manager 210 may include one or more message queue APIs which may include, but are not limited to, specifications for at least one routine, data structure, data class, or protocol, a description of a set of class definitions with a set of behaviors associated with those classes, one or more language bindings, and a defined set of Hypertext Transfer Protocol (HTTP) or Extensible Markup Language (XML) request messages and a definition of the structure of response messages. In the example, LDAP request definitions 122 and LDAP request definitions 128 may be distributed within one or more of message queuing applications 204, queue manager 210, and LDAP bridge service 206 for specifying the structure and other specifications of generic LDAP request messages and generic LDAP response messages.

In one example, LDAP bridge service 206, queue manager 210 and message queues 212 and 214 represent layers within generic LDAP interface 120, implemented within a system running both a client and server implementation of message queuing applications 204. In the example, LDAP bridge client 208, which includes at least one of message queuing applications 204 which use generic LDAP interface 120, may call queue manager 210 for placing LDAP request messages in message queue 212, for requesting to listen to message queue 214, and for retrieving messages from message queue 214. Asynchronously, LDAP bridge service 206 calls queue manager 210 to read LDAP request messages from message queue 212. LDAP bridge service 206 validates LDAP request messages read from message queue 212. LDAP bridge service 206 translates LDAP request messages into specific LDAP API calls and LDAP bridge service 206 calls the LDAP API, such as by calling an LDAP API to access LDAP services 216. LDAP bridge service 206 receives an LDAP specific response from the called LDAP API, translates the LDAP specific response into a structured data response message according to LDAP response definitions 128, and places the structured data response message in message queue 214. LDAP bridge client 208 listens to message queue 214 through queue manager 210 and reads structured data response messages from message queue 214, where the requesting message queuing application then processes the structured data response message, which provides message queuing applications 204 with a specific LDAP service without message queuing applications 204 invoking the LDAP API or connecting with an LDAP service through the LDAP API.

In the example, LDAP bridge service 206 and LDAP bridge client 208 are functional layers added to application layer 220 to integrate the functionality of an API with the functionality of queue manager 210, message queue 212, and message queue 214, for message queuing applications 204. By integrating the functionality of an API with the functionality of queue manager 210, message queue 212, and message queue 214 for LDAP bridge client 208, message queuing applications 204 that use generic LDAP interface 120 may access LDAP services without having to generate and bind to specific LDAP API calls.

In another example, applications 202 and message queuing applications 204 are illustrated as specifically referencing middleware and LDAP services 216 and directly connecting with middleware and LDAP services 216 through an LDAP API, rather than communicating with middleware and LDAP services 216 through LDAP bridge client 208 and LDAP bridge service 206. In the example where applications 202 or message queuing applications 204 directly connect with middleware and LDAP services 216, applications 202 or message queuing applications 204 are required to maintain code to generate a specific API call for an LDAP API, to connect with the LDAP API, to wait for a response from the LDAP API, and to handle any errors, data loss issues, and security issues during the connection with the LDAP API call.

Figure 3:
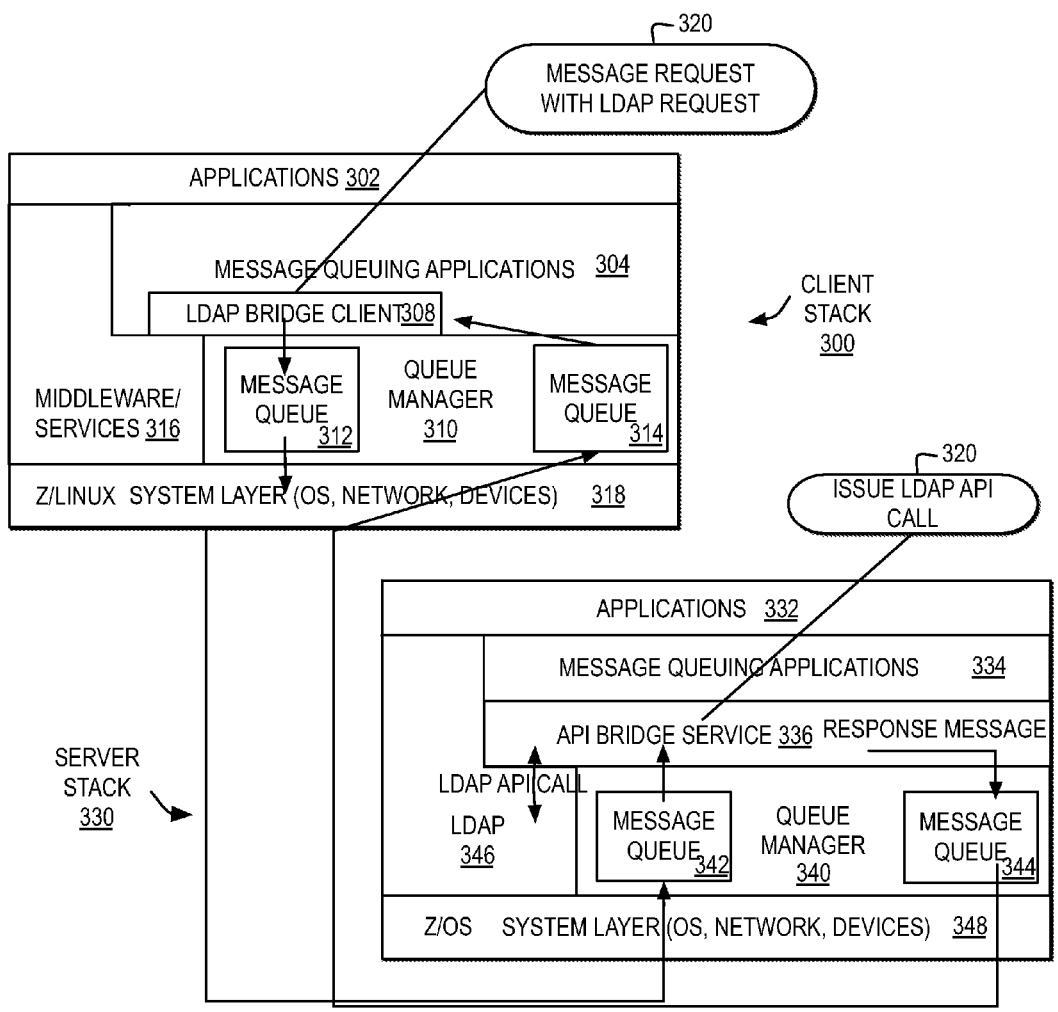
FIG. 3 illustrates a block diagram of one example of a system layer diagram for implementing each of a client and server for a message queuing application and generic LDAP interface distributed across different systems.

FIG. 3 illustrates a block diagram of one example of a system layer diagram for implementing each of a client and server for a generic LDAP interface distributed across different systems. In the example in FIG. 3, a client stack 300 includes multiple layers, including an application layer 320, a middleware layer 322, and a system layer 318, which may include one or more of one or more operating system (OS) layers, one or more network layers, and one or more devices and device layers. In addition, a server stack 330 includes multiple layer, including an application layer 350, a middleware layer 352 and a system layer 348. A client system implementing client stack 300 is operatively connected to a server system implementing server stack 330.

In the example, client stack 300 represents the client implementation of message queuing applications and generic LDAP interface 120. Application layer 320 of client stack 300 may include applications 302, message queuing applications 304, and an LDAP bridge client 308, where LDAP bridge client 308 includes message queuing applications that use generic LDAP interface 120. In addition, in the example, middleware layer 322 of client system 300 may include middleware and services 316, queue manager 310, and message queues 212 and 214.

In addition, in the example, server stack 330 represents the server implementation of message queuing applications and generic LDAP interface 120. Application layer 350 of server stack 330 may include applications 332, message queuing applications 334, an LDAP bridge service 336, and an LDAP bridge client 338. In addition, in the example, middleware layer 352 of server stack 330 may include LDAP services 346, queue manager 340, message queue 342, and message queue 344.

In one example, message queuing application 102 may be distributed across one or more of message queuing applications 304, within LDAP bridge client 308, and message queuing applications 334. In addition, generic LDAP interface 120 may be distributed across LDAP bridge service 336, queue manager 310, message queue 312, message queue 314, queue manager 340, message queue 342, and message queue 344.

In the example, LDAP bridge client 308 is a functional layer added to client message queuing applications 304 that use generic LDAP interface 120 and LDAP bridge service 336 is a functional layer added to server message queuing applications 334 to integrate the functionality of an API with the functionality of message queuing at the client through queue manager 310, message queue 312, and message queue 314 and at the server through queue manager 340, message queue 342, and message queue 344.

In particular, in the example, system layer 318 is running a z/Linux operating system and system layer 348 is running a z/OS operating system. A distributed message queuing application that uses generic LDAP interface 120, illustrated by LDAP bridge client 308, is running on the z/Linux operating system illustrated by client stack 300. LDAP bridge client 308 needs to access directory services from an LDAP service running on a z/OS operating system, such as LDAP services 346, as illustrated by server stack 330. In the example, the distributed message queuing application of LDAP bridge client 308 creates a message request conforming to LDAP request definitions 122 with an LDAP request, as illustrated at reference numeral 320, and places the request message in message queue 312. Messages placed in message queue 312 are passed to message queue 342, the remote representation of message queue 312. LDAP bridge service 336 on server stack 330 listens to message queue 342 and reads new messages from message queue 342. LDAP bridge services 336 formats the request message into a specific LDAP API call and LDAP bridge service 336 issues the LDAP API call, as illustrated at reference numeral 320, to LDAP service 346. LDAP service 346 receives the LDAP API call, handles the LDAP access request, and returns a result to LDAP bridge service 336. In the example, LDAP bridge service 336 formats the result returned from the LDAP API call into a response message according to LDAP response definitions 128. LDAP bridge service 336 places the response message in message queue 344. Messages placed in message queue 344 are passed to message queue 314, the remote representation of message queue 344. The distributed message queuing application, upon detecting a new response message on message queue 314, retrieves the response message from message queue 314 and processes the response message. The response message received by the distributed message queuing application provides the application with an LDAP service through generic LDAP bridge service 120, without the message queuing application having to build and issue an LDAP API call to receive the LDAP service.

Figure 4:
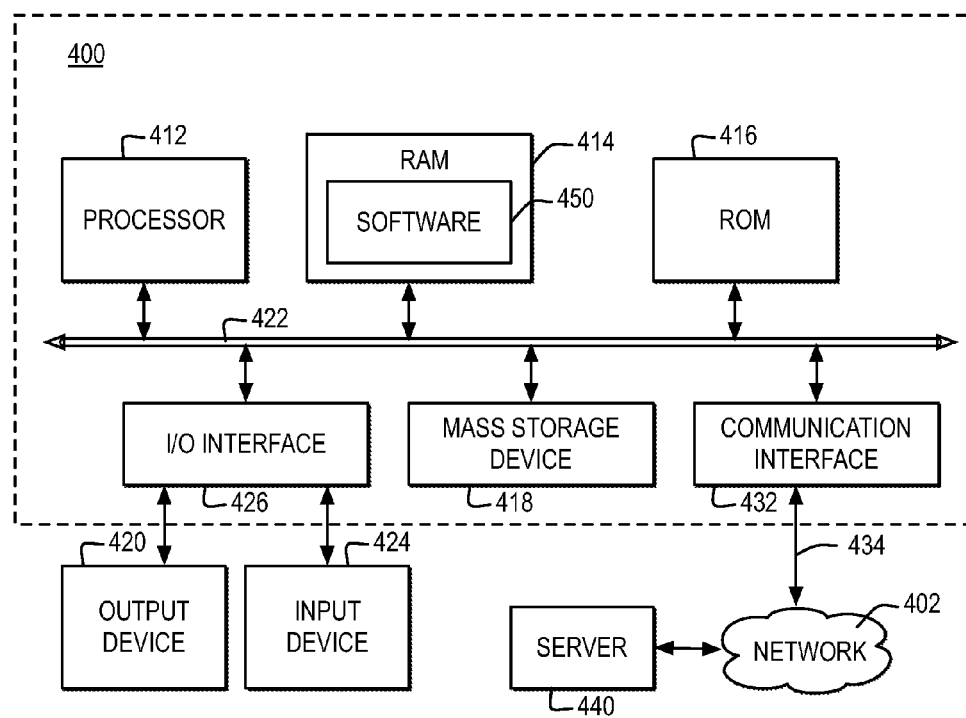
FIG. 4 illustrates one example of a computer system in which one embodiment of the invention may be implemented.

FIG. 4 illustrates one example of a computer system in which one embodiment of the invention may be implemented. The present invention may be performed in a variety of systems and combinations of systems, made up of functional components, such as the functional components described with reference to computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power. Where multiple processors share bus 422, additional controllers (not depicted) for managing bus access and locks may be implemented.

Processor 412 may be at least one general-purpose processor such as IBM® PowerPC® processor that, during normal operation, processes data under the control of software 450, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software 450 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 412 may control the operations of flowchart of FIGS. 5-8 and other operations described herein. Operations performed by processor 412 may be requested by software 450 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 418, a random access memory (RAM), such as RAM 414, a read-only memory (ROM) 416, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 400, partly on the user's computer, as a stand-alone software package, partly on the user's computer and partly on a remote computer or entirely on the remote computer or server, such as server 440. In the latter scenario, the remote computer may be connected to the user's computer through any type of network, such as network 402, through a communication interface, such as network interface 432, over a network link that may be connected, for example, to network 402.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 400, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 400, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 432, the network link to network 402, and network 402 may use electrical, electromagnetic, or optical signals that carry digital data streams. The signals through the various networks and the signals on network 402, the network link to network 402, and network interface 432 which carry the digital data to and from computer system 400, may be forms of carrier waves transporting the information.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

Figure 5:
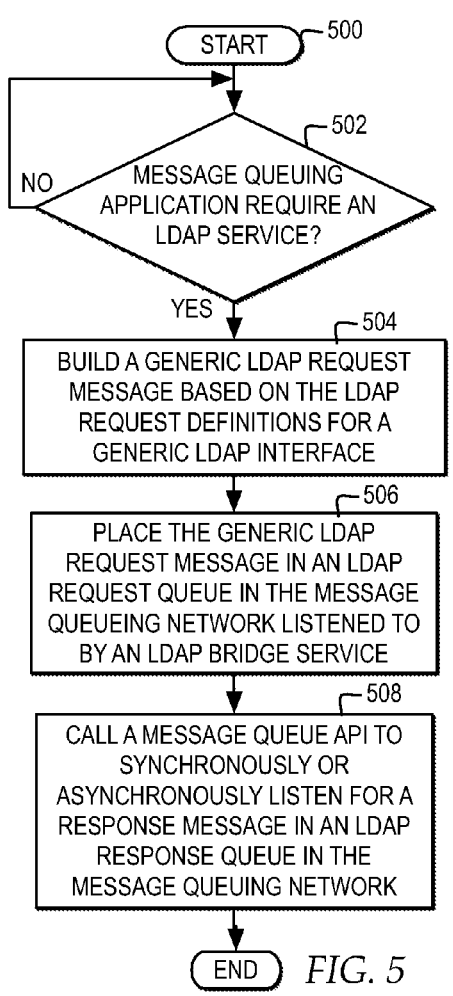
FIG. 5 illustrates a high level logic flowchart of a process and program for managing an LDAP API-independent request for an LDAP service by a message queuing application.

FIG. 5 illustrates a high level logic flowchart of a process and program for managing an API-independent request for an LDAP service by a message queuing application. In the example, the process starts at block 500 and thereafter proceeds to block 502. Block 502 illustrates a determination whether a message queuing application requires an LDAP service. If a message queuing application requires an LDAP service, then the process passes to block 504. Block 504 illustrates building a generic LDAP request message based on the LDAP request definitions for a generic LDAP interface. Next, block 506 illustrates placing the generic LDAP request message in an LDAP request queue in the message queuing network listened to by an LDAP bridge service. Thereafter, block 508 illustrates calling a message queue LDAP to request to listen for a response message on an LDAP response queue in the message queuing network or to identify a listener or callback routine for the queue manager to call when a new message is available on the LDAP response queue, and the process ends.

Figure 6:
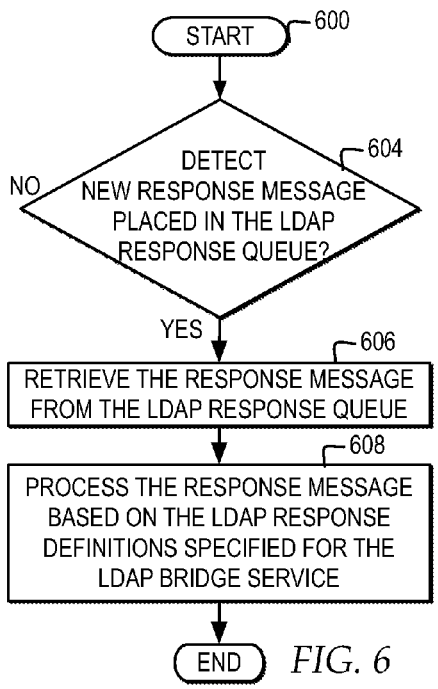
FIG. 6 illustrates a high level logic flowchart of a process and program for managing a generic LDAP response providing LDAP services to a message queuing application.

FIG. 6 illustrates a high level logic flowchart of a process and program for managing a generic LDAP response providing specific LDAP services to a message queuing application. In the example, the process starts at block 600 and thereafter proceeds to block 604. Block 604 illustrates a determination whether the message queuing application detects a new response message placed in the LDAP response queue. If the message queuing application detects a new response message placed in the LDAP response queue, then the process passes to block 606. Block 606 illustrates retrieving the response message from the LDAP message queue. Next, block 608 depicts processing the response message based on the API response definitions specified for the LDAP bridge service, and the process ends. In one example, the response message may include LDAP specific services, processed by the message queuing application. In another example, the response may include an error message, and the message queuing application handles the error.

Figure 7:
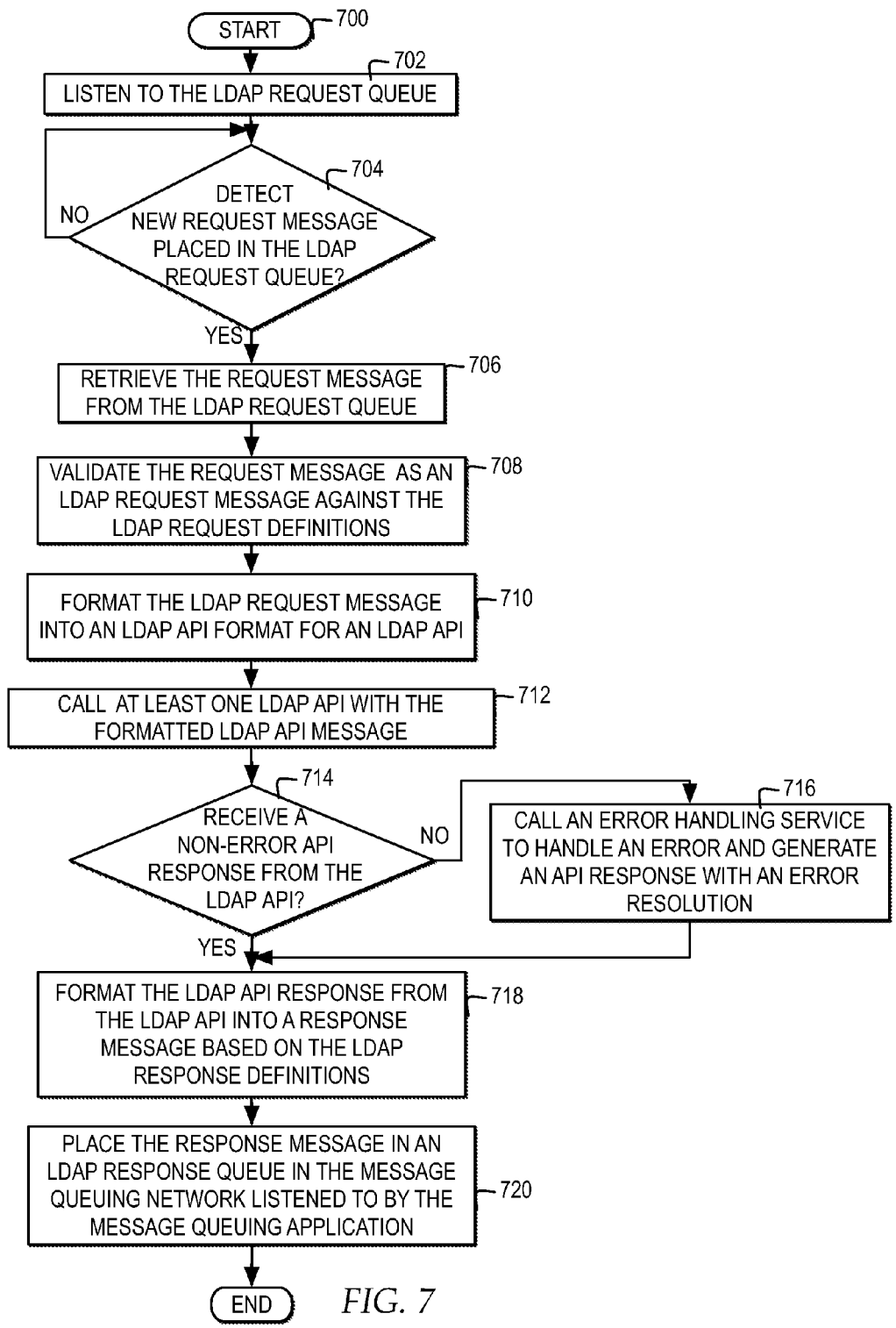
FIG. 7 illustrates a high level logic flowchart of a process and program for managing request messages by an LDAP bridge service of a generic LDAP interface.

FIG. 7 illustrates a high level logic flowchart of a process and program for managing request messages by a LDAP bridge service of a generic LDAP interface. In the example, the process starts at block 700 and thereafter proceeds to block 702. Block 702 illustrates the LDAP bridge service listening to an LDAP request queue. Next, block 704 illustrates a determination whether the LDAP bridge service detects a new request message placed in the LDAP request queue. In response to the LDAP bridge service detecting a new request message placed in the LDAP request queue, the process passes to block 706. Block 706 illustrates retrieving the request message from the request queue. Next, block 708 illustrates validating the request message is a generic LDAP request message against the LDAP request definitions. Thereafter, block 710 illustrates formatting the generic LDAP request message into an LDAP specific request format for a specific LDAP service. Next, block 712 depicts calling at least one specific LDAP with the LDAP specific request, to invoke an LDAP API. Thereafter, block 714 illustrates a determination whether the LDAP bridge service detects a non-error API response from the LDAP API.

At block 714, if the LDAP bridge service receives an error API response or does not receive any response from the LDAP API within a set period of time, the process passes to block 716. Block 716 illustrates calling an error handling service to handle an error and generate an LDAP API response with an error resolution, and the process passes to block 718.

In addition, at block 714, if the LDAP bridge service detects a non-error API response from the LDAP API, then the process passes to block 718. Block 718 illustrates formatting the LDAP API response from the LDAP API into a generic LDAP response message based on the LDAP response definitions. Next, block 720 illustrates placing the generic LDAP response message in an LDAP response queue in the message queuing network listened to by the message queuing application, and the process ends. In one example, the LDAP bridge service may call a queue manager when performing one or more of the steps of blocks 702, 704, 706, and 720.

Figure 8:
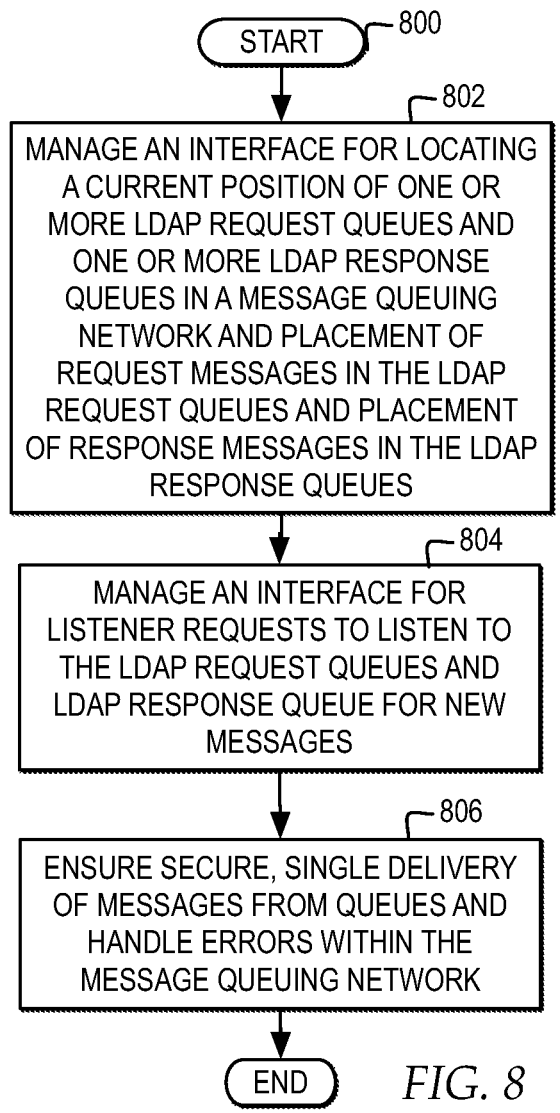
FIG. 8 illustrates a high level logic flowchart of a process and program for managing a queue manager of a message queuing network.

FIG. 8 illustrates a high level logic flowchart of a process and program for managing a queue manager of a message queuing network. In the example, the process starts at block 800 and thereafter proceeds to block 802. Block 802 illustrates managing an interface for locating of a current position of one or more LDAP request queues and one or more LDAP response queues in a message queuing network, for placement of LDAP request messages in the LDAP request queues, for and placement of LDAP response messages in the LDAP response queues. Next, block 804 illustrates managing an interface for listener requests to listen to the LDAP request queues and LDAP response queues for new messages. Thereafter, block 806 illustrates ensuring the secure, single delivery of messages from queues and handling errors within the message queuing network, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for a message queuing application to access a logical directory access protocol (LDAP) service, comprising:
    responsive to an LDAP bridge service detecting a request message placed in a request queue of a message queuing network by a message queuing application, retrieving, by the LDAP bridge service, the request message from the request queue, wherein the request message comprises a generic LDAP message request, wherein the generic LDAP message request comprises an LDAP server request in a message queue format;
    formatting, by the LDAP bridge service, the generic LDAP message request in the request message into a particular application programming interface (API) call for at least one LDAP API;
    calling, by the LDAP bridge service, the at least one LDAP API with the particular API call for requesting at least one LDAP service from at least one LDAP server managing a distributed directory, wherein the LDAP server is accessed through the at least one LDAP API;
    responsive to the LDAP bridge service receiving at least one LDAP specific response from the at least one LDAP API, formatting, by the LDAP bridge service, the at least one LDAP specific response into a response message comprising a generic LDAP response; and
    placing, by the LDAP bridge service, the response message in a response queue of the message queuing network, wherein the message queuing application listens to the response queue for the response message and retrieves the response message to receive the at least one LDAP service through the at least one LDAP API without calling the at least one LDAP API.

2. The method of claim 1, wherein responsive to an LDAP bridge service detecting a request message placed in a request queue of a message queuing network by a message queuing application, retrieving, by the LDAP bridge service, the request message from the request queue, wherein the request message comprises a generic LDAP message request further comprises:
    listening, by the LDAP bridge service, to the request queue for the request message placed in the request queue by the message queuing application, wherein the generic LDAP message request of the request message comprises a structured data message specified by LDAP request definitions for the LDAP bridge service, wherein the LDAP request definitions specify a message format independent of a protocol specified for the particular API call, wherein the structured data message comprises a structured data message format comprising an extensible markup language (XML) format.

3. The method of claim 1, wherein responsive to an LDAP bridge service detecting a request message placed in a request queue of a message queuing network by a message queuing application, retrieving, by the LDAP bridge service, the request message from the request queue, wherein the request message comprises a generic LDAP message request further comprises:
    listening, by the LDAP bridge service, to the request queue for the request message placed in the request queue by the message queuing application, wherein the generic LDAP message request of the request message is not a call to invoke the at least one LDAP API.

4. The method of claim 1, further comprising:
    listening, by the LDAP bridge service, to the request queue for the request message placed in the request queue by calling a message queue API of the message queuing network.

5. The method of claim 1, further comprising:
    listening, by the message queuing application, to the response queue asynchronously from placement, by the message queuing application, of the request message in the request queue; and
    responsive to the message queuing application detecting the response message placed in the response queue, retrieving, by the message queuing application, the response message from the response queue.

6. The method of claim 1, further comprising:
    responsive to the message queuing application requiring the at least one LDAP service, building, by the message queuing application, the request message with the generic LDAP message request for the at least one LDAP service according to at least one LDAP request definition specified by the LDAP bridge service;
    requesting, by the message queuing application, placement of the request message in the LDAP request queue by calling a message queue API of the message queuing network;

calling, by the message queuing application, the message queue API of the message queuing network to open a listener on the response queue;

responsive to the listener detecting the response message on the response queue, retrieving, by the message queuing application, the response message from the response queue for the message queuing application; and processing, by the message queuing application, the response message.

7. A system for a message queuing application to access a logical directory access protocol (LDAP) service, comprising:

an LDAP bridge service, comprising at least one processor and a memory, responsive to an LDAP bridge service detecting a request message placed in a request queue of a message queuing network by a message queuing application, operative to retrieve, the request message from the request queue, wherein the request message comprises a generic LDAP message request, wherein the generic LDAP message request comprises an LDAP server request in a message queue format;

the LDAP bridge service operative to format the generic LDAP message request in the request message into a particular application programming interface (API) call for at least one LDAP API;

the LDAP bridge service operative to call the at least one LDAP API with the particular API call for requesting at least one LDAP service from at least one LDAP server managing a distributed directory, wherein the LDAP server is accessed through the at least one LDAP API;

the LDAP bridge service, responsive to the LDAP bridge service receiving at least one LDAP specific response from at least one LDAP API, operative to translate the at least one LDAP specific response into a response message comprising a generic LDAP response; and the LDAP bridge service operative to place the response message in a response queue of the message queuing network, wherein the message queuing application listens to the response queue for the response message and retrieves the response message to receive the at least one LDAP service through the at least one LDAP API without calling the at least one LDAP API.

8. The system of claim 7, wherein the LDAP bridge service, responsive to an LDAP bridge service detecting a request message placed in a request queue of a message queuing network by a message queuing application, operative to retrieve the request message from the request queue, wherein the request message comprises a generic LDAP message request further comprises:

the LDAP bridge service operative to listen to the request queue for the request message placed in the request queue by the message queuing application, wherein the generic LDAP message request of the request message comprises a structured data message specified by LDAP request definitions for the LDAP bridge service, wherein the LDAP request definitions specify a message format independent of a protocol specified for the particular API call, wherein the structured data message comprises a structured data message format comprising an extensible markup language (XML) format.

9. The system of claim 7, wherein the LDAP bridge service, responsive to detecting a request message placed in a request queue of a message queuing network by a message queuing application, operative to retrieve the request message from the request queue, wherein the request message comprises a generic LDAP message request further comprises:

the LDAP bridge service operative to listen to the request queue for the request message placed in the request queue by the message queuing application, wherein the generic LDAP message request of the request message is not a call to invoke the at least one LDAP API.

10. The system of claim 7, further comprising:

the LDAP bridge service operative to listen to the request queue for the request message placed in the request queue by calling a message queue API of the message queuing network.

11. The system of claim 7, further comprising:

the message queuing application operative to listen to the response queue asynchronously from placement, by the message queuing application, of the request message in the request queue; and the message queuing application, responsive to detecting the response message placed in the response queue, operative to retrieve the response message from the response queue.

12. The system of claim 7, further comprising:

the message queuing application, responsive to the message queuing application requiring the at least one LDAP service, operative to build the request message with the generic LDAP message request for the at least one LDAP service according to at least one LDAP request definition specified by the LDAP bridge service;

the message queuing application operative to request placement of the request message in the LDAP request queue by calling a message queue API of the message queuing network;

the message queuing application operative to call the message queue API of the message queuing network to open a listener on the response queue;

the message queuing application, responsive to the listener detecting the response message on the response queue, operative to retrieve the response message from the response queue for the message queuing application; and the message queuing application operative to process the response message.

13. A computer program product for a message queuing application to access a logical directory access protocol (LDAP) service, comprising:

one or more computer-readable, tangible storage devices;

program instructions, stored on at least one of the one or more storage devices, responsive to an LDAP bridge service detecting a request message placed in a request queue of a message queuing network by a message queuing application, to retrieve, by the LDAP bridge service, the request message from the request queue, wherein the request message comprises a generic LDAP message request, wherein the generic LDAP message request comprises an LDAP server request in a message queue format;

program instructions, stored on at least one of the one or more storage devices to format, by the LDAP bridge service, the generic LDAP message request in the request message into a particular application programming interface (API) call for at least one LDAP API;

program instructions, stored on at least one of the one or more storage device to call, by the LDAP bridge service, the at least one LDAP API with the particular API call for requesting at least one LDAP service managing a distributed directory, wherein the LDAP server is accessed through the at least one LDAP API;

program instructions, stored on at least one of the one or more storage devices, responsive to the LDAP bridge service receiving at least one LDAP specific response from the at least one LDAP API, to translate, by the LDAP bridge service, the at least one LDAP specific response into a response message comprising a generic LDAP response; and program instructions, stored on at least one of the one or more storage devices, to place, by the LDAP bridge service, the response message in a response queue of the message queuing network, wherein the message queuing application listens to the response queue for the response message and retrieves the response message to receive the at least one LDAP API service through the at least one LDAP API without calling the at least one LDAP API.

14. The computer program product of claim 13, further comprising:

program instructions, stored on at least one of the one or more storage devices, to listen, by the LDAP bridge service, to the request queue for the request message placed in the request queue by the message queuing application, wherein the generic LDAP message request of the request message comprises a structured data message specified by LDAP request definitions for the LDAP bridge service, wherein the LDAP request definitions specify a message format independent of a protocol specified for the particular API call, wherein the structured data message comprises a structured data message format comprising an extensible markup language (XML) format.

15. The computer program product of claim 13, further comprising:

program instructions, stored on at least one of the one or more storage devices, to listen, by the LDAP bridge service, to the request queue for the request message placed in the request queue by the message queuing application, wherein the generic LDAP message request of the request message is not a call to invoke the at least one LDAP API.

16. The computer program product of claim 15, further comprising:

program instructions, stored on at least one of the one or more storage devices, to listen, by the LDAP bridge service, to the request queue for the request message placed in the request queue by calling a message queue API of the message queuing network.

17. The computer program product of claim 15, further comprising:

program instructions, stored on at least one of the one or more storage devices, to listen, by the message queuing application, to the response queue asynchronously from placement, by the message queuing application, of the request message in the request queue; and program instructions, stored on at least one of the one or more storage devices, responsive to the message queuing application detecting the response message placed in the response queue, to retrieve, by the message queuing application, the response message from the response queue.

18. The computer program product of claim 15, further comprising:

program instructions, stored on at least one of the one or more storage devices, responsive to the message queuing application requiring the specific LDAP service, to build, by the message queuing application, the request message with the generic LDAP message request for the specific LDAP service according to at least one LDAP request definition specified by the LDAP bridge service;

program instructions, stored on at least one of the one or more storage devices, to request, by the message queuing application, placement of the request message in the LDAP request queue by calling a message queue API of the message queuing network;

program instructions, stored on at least one of the one or more storage devices, to call, by the message queuing application, the message queue API of the message queuing network to open a listener on the response queue;

program instructions, stored on at least one of the one or more storage devices, responsive to the listener detecting the response message on the response queue, to retrieve, by the message queuing application, the response message from the response queue for the message queuing application; and program instructions, stored on at least one of the one or more storage devices, to process, by the message queuing application, the response message.

19. A method for a message queuing application accessing a specific application programming in interface (API) service, comprising:

building, by a message queuing application, a request message for an LDAP service in a generic LDAP message request validated using LDAP request definitions available to the message queuing application and available to an LDAP bridge service, wherein the generic LDAP message request comprises an LDAP server request in a message queue format, wherein the generic LDAP message request of the request message comprises a structured data message specified by the LDAP request definitions for the LDAP bridge service, wherein the LDAP request definitions specify a message format independent of a protocol specified for any particular API call, wherein the structured data message comprises a structured data message format comprising an extensible markup language (XML) format;

placing by the message queuing application, the generic LDAP message request in a request message queue of a message queuing network providing a generic LDAP interface;

listening, by an LDAP bridge service of the generic LDAP interface, to the message queue;

responsive to the LDAP bridge service detecting the generic LDAP message request in the message queue, retrieving, by the LDAP bridge service, the generic LDAP message request from the message queue, formatting the structured data message of the generic LDAP message request from the LDAP server request in the message queue format into a call to an LDAP API in a particular format protocol specified for the LDAP API, calling the LDAP API, formatting a result returned by the LDAP API from the particular format protocol specified for the LDAP API into a generic LDAP response message validated using LDAP response definitions available to the message queuing application and available to the LDAP bridge service, wherein the generic LDAP response comprises an LDAP server response in a message queue format, and placing the generic LDAP response message in a response message queue of the message queuing network of the generic LDAP interface;

retrieving, by the message queuing application, the generic LDAP response message from the response message queue; and processing the generic LDAP response message, wherein the response message provides the message queuing application with the LDAP service without the message queuing application calling the LDAP API for the LDAP service.

\* \* \* \* \*